Oct. 18, 1966     R. L. KOPERNAK     3,279,674
DESOLDERING DEVICE
Filed Jan. 10, 1964     2 Sheets-Sheet 1
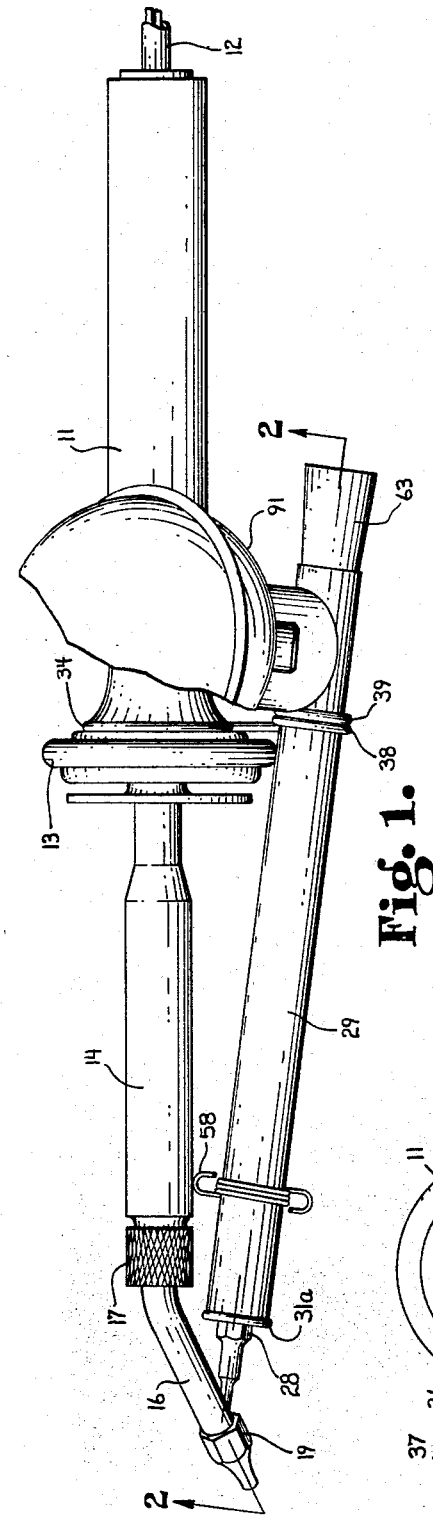
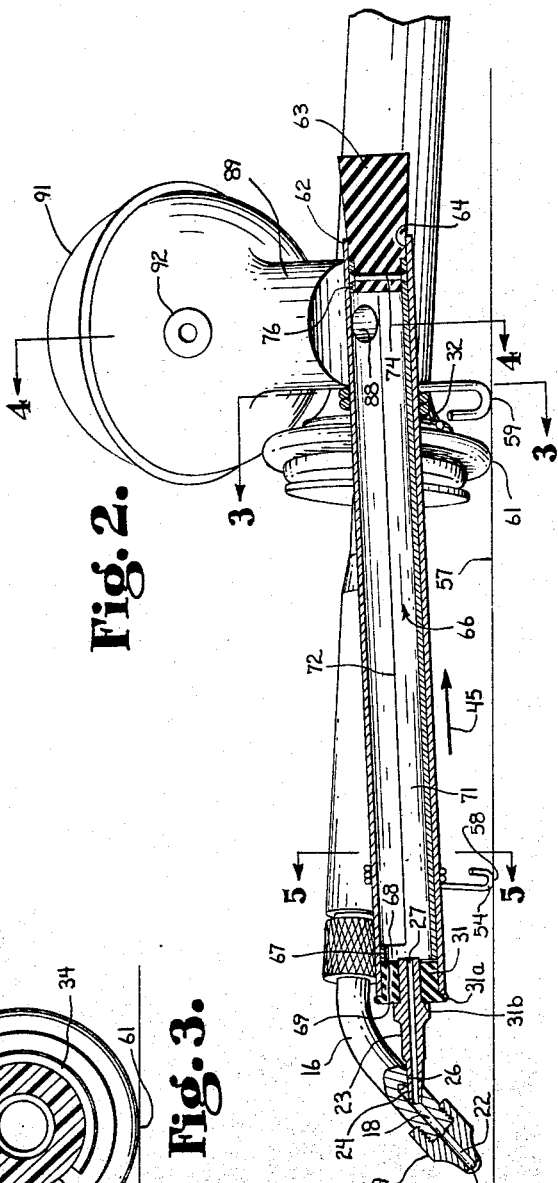
INVENTOR.
Rudy L. Kopernak Oct. 18, 1966  R. L. KOPERNAK  3,279,674
DESOLDERING DEVICE Filed Jan. 10, 1964  2 Sheets-Sheet 2

INVENTOR.
Rudy L. Kopernak
BY
Lockwood, Woodard, Smith & Weikart
Attorneys

United States Patent Office 3,279,674
Patented Oct. 18, 1966

3,279,674
DESOLDERING DEVICE
Rudy L. Kopernak, 6222 Park Ave., Indianapolis, Ind.
Filed Jan. 10, 1964, Ser. No. 337,073
16 Claims. (Cl. 228—20)

This invention relates generally to soldering and desoldering devices, and more particularly to a desoldering device having a readily cleanable and removable solder receiver assembly, and having an efficient, reliable, and self-contained source of vacuum which is easily operated by the thumb of the hand of the person using the device.

Several varieties of soldering and desoldering irons and guns have been devised and patented. Additional soldering and desoldering tools representing improvements over those which have been patented, are the subject matter of other applications of mine which are now pending in the Patent Office.

It is an object of the present invention to provide an improved desoldering device.

A further object is to provide a device which can be produced at low cost without sacrificing performance.

A further object is to provide a device which can utilize a number of readily available conventional parts in combination with comparatively inexpensive and easily produced additional parts to achieve the foregoing objects.

A still further object is to provide a device which can be held and operated in one hand of a workman with the utmost comfort and convenience.

A still further object is to provide a device which can be cleaned readily without disturbing any part other than the specific cleaning element itself.

A still further object is to provide a device which can be disassembled and reassembled quickly.

A still further object is to provide a device having efficient and reliable means for supporting the heated parts thereof safely above a supporting surface such as a table top or the like.

Described briefly, a typical embodiment of the present invention incorporates a handle with a heating element mounted thereto and supported thereby. An apertured thermally conductive tip assembly is secured to the heating element and is heated thereby.

An elongated tubular solder receiver communicates with the apertured tip assembly, and one end of the receiver is supported thereby through a thermally conductive tube fitting and a substantially non-conductive air seal. From a point adjacent the tip assembly, the solder receiver extends rearwardly to a point adjacent the handle where it is secured to the handle by resilient and quickly releasable clamping means.

A flexible bulb is mounted to a stem extending laterally from the solder receiver. The collapsible portion of the bulb has one outer margin thereof immediately adjacent a portion of the handle with the diametrically opposite outer margin thereof located approximately on a radius extending from the handle. This facilitates collapsing and releasing of the bulb with but a single digit of the hand, such as the thumb, for example.

The full nature of the invention will be understood from the accompanying drawings and the following description and claims.

FIG. 1 is a top plan view of a typical embodiment of the present invention.

FIG. 2 is a section therethrough taken along the line 2—2 in FIG. 1 and viewed horizontally in the direction of the arrows.

FIG. 3 is a cross section therethrough taken along the line 3—3 in FIG. 2 and viewed in the direction of the arrows.

Figure 4:
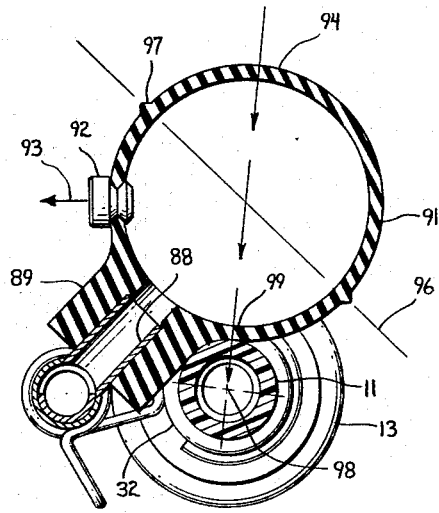
FIG. 4 is a cross section therethrough taken along the line 4—4 in FIG. 2 and viewed in the direction of the arrows.

Referring now to the drawings in detail, and particularly FIG. 1 thereof, the tool includes an elongated electrically and thermally insulated handle 11. An electrical supply cord 12, extends from the rear end of the handle. The forward end portion 13 of the handle is flared outwardly to avoid contact of the hand of the operator with the heated portion of the tool. Other handle configurations can be used within the scope of the present invention so the word handle is used generically in the claims appended hereto.

A thermally conductive housing 14 encloses an electrical heating element (not shown) which is supplied with electrical current from the supply cord 12. A heat transmitting member 16, is secured to housing 14 by means of the knurled nut 17 which is threadedly received on the housing 14. It will be recognized that the handle, heating element housing, and knurled nut portions of the tool can be quite conventional and such structures are readily available from manufacturers of standard soldering equipment.

The heat transmitting member 16 may be of circular cross section and has a passageway 18 (FIG. 2) therein. A tip 19 having an aperture 21 in its distal end, is threadedly received on the heat transmitting member 16. The aperture in the tip communicates through the passageway 22 therein to the passageway 18 in the heat transmitting member 16.

A thermally conductive tube fitting 23, whose forward end portion 24 is tapered, is supported in the heat transmitting member 16. The tapered portion of tube 23 is fittingly received by a tapered aperture 26 in the member 16. The tapered aperture 26, communicates with the passageway 18 in the member 16, and there is thereby provided a passageway from the tip aperture 21 to the rear end opening 27 of the tube 23. A hexagonal boss 28 is provided on the tube 23. This provision facilitates rotation of the tube 23 in the member 16 which is helpful to remove the tube 23, if and when desired for cleaning, though this operation is seldom necessary.

The solder receiver is shown in the form of an elongated tube 29 of circular cross section. The forward end of the tube has an air seal 31 mounted thereto, this seal having a flange 31a abutting the forward end of the receiver tube. The front face 31b of the seal engages the rear face of the hexagonal boss 28. The seal has an aperture therein embracing the tube 23, and the rear end of the tube projects slightly rearwardly from the rear face of the seal. A portion of the seal projects into the receiver and seals against the inner cylindrical surface of the receiver.

Figure 8:
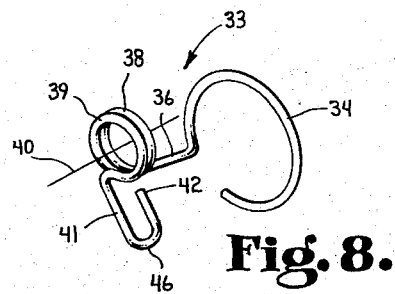
FIG. 8 is a perspective view of the solder receiver fastening means employed in the typical embodiment.

A circumferential groove 32 is provided in the flared portion of the handle 11. A novel, spring wire fastener 33 (FIG. 8) secures the rear portion of the solder receiver to the handle 11. This fastener includes a hook portion 34 received in the circumferential groove 32 of the handle. A portion 36 extends radially outwardly from the hook portion (FIG. 3). At an appropriate distance out from the longitudinal axis of the handle, the wire is formed into a looped portion 37 which includes two turns 38 and 39, both of which resiliently embrace the receiver tube 29. The resilient embracing feature is obtained by forming the fastener such that in its free form, the internal diameter of the turns of wire in the looped portions is slightly less than the outside diameter of the tube 29.

At the end of the second turn 39, a length 41 of the wire extends radially with respect to the longitudinal axis of the receiver tube, and axis 40 of the looped portion. The end 42 thereof is turned back forming a generally U-shaped portion which provides a surface in the plane 43 (FIG. 3). By providing a surface in the plane 43, the thumb or any other reasonably strong digit of the hand of a workman can be pressed on the portion 41 near the outer end 46 thereof to open the looped portion so that axial and rotary motion of the receiver tube in the fastener is accommodated. This accommodates removal of the tube 29 from the air seal and tube fitting assembly by simply pulling the receiver tube 29 rearwardly in the direction of the arrow 45. It is desirable, of course, that the wire or other material employed for the fastener have sufficient resiliency that immediately upon releasing the loop expanding force from the leg portion, the loop will again return into the same degree of gripping of the receiver tube as it had prior to being expanded. In this way, repeated removal of the receiver tube from the rest of the device is facilitated, in the event that this may be desired. It has been found in the use of the device that occasionally it is desirable to remove and clean or replace the tube fitting 23. The facility with which the novel fastener of the present invention accommodates rearward movement or removal of the receiver tube makes the removal of the tube fitting 23 and replacement thereof a matter of but a few seconds.

Figure 5:
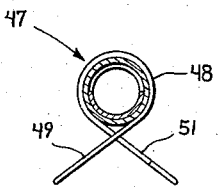
FIG. 5 is a cross section through a portion thereof taken along the line 5—5 in FIG. 2 and viewed in the direction of the arrows.
Figure 9:
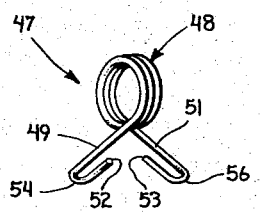
FIG. 9 is a perspective view of the support stand device employed in the illustrated embodiment.

The fastener serves an additional function as will become apparent. This function is to provide one point of support for the desoldering device when it is rested on a table or other supporting surface. Referring particularly to FIGS. 2, 5, and 9, a stand 47 is provided and is made of a single piece of wire having a looped portion 48 consisting of three turns of wire and a pair of diverging legs 49 and 51. A single piece of wire is used for the stand and one end 52 of the wire is turned back with respect to the leg 49 to form a generally U-shaped portion and the other end 53 is turned back with respect to the leg 51 to also form a generally U-shaped portion. In this way, rounded surfaces 54 and 56 are available to rest on a supporting surface.

The wire of which the stand is typically formed is resilient and the loops or turns of the looped portion are of a diameter slightly smaller than the outside diameter of the receiver tube. Therefore, the looped portion of the stand resiliently embraces or grips the outer surface of the receiver tube much in the same manner as does the looped portion of the receiver fastener 33. To enlarge the loop and locate the stand wherever desired longitudinally of the receiver tube, it is only necessary to grip the two legs between the fingers and squeeze them toward each other and slide the stand along the receiver tube.

As shown in FIG. 2, all portions of the desoldering device lie above an imaginary horizontal plane 57 which touches some portion of the device at three points. It touches the curved portion 54 of the stand leg 49 at the point 58. It touches the curved portion of the fastener leg 41 at the point 59, and it touches the flared portion of the handle at the point 61. As can be seen from reference to FIGS. 1, 2, 3, and 4, these points define the apices of a triangle lying in the plane 57. Therefore, if the plane 57 happens to be a table top, for example, it will be observed that all portions of the desoldering device, and particularly the heated portions thereof, will be disposed in vertically spaced relationship to the supporting surface. The center of gravity of the device is above a point lying well within the lines drawn between the points 58, 59, and 61, so that the desoldering device is quite stable. If desired, the stand 47 can be rotated with respect to the axis of the receiver tube by squeezing the legs together as described above, to place the curved portions of both of the legs in a common plane with the points 59 and 61. In this way, four point support can be provided if desired. However, it is not necessary.

A closure for the rear end 62 of the solder receiver is provided in the form of a tapered rubber stopper 63. This stopper sealingly engages an inner curved perimetrical surface of the receiver, and, in the illustrated embodiment this may be any place on the inner cylindrical surface 64 of the receiver adjacent the rear end 62 thereof.

A cleaner is provided inside the solder receiver tube and includes a cylinder 67 of short length which, in effect, forms a ring at the front end thereof. The rear edge 68 of the ring is a short longitudinal distance from the front edge 69 of the ring. The outer circles of these edges lie immediately adjacent the inner cylindrical surface of the tube. A semicylindrical shell portion 71 extends rearwardly from the ring and, in fact, the major portion of the cleaner can be a cylindrical tube closely fitting inside the receiver tube and having a portion of the wall of the inner tube cut away. This leaves elongated upper marginal edges 72 and 73. A pin 74 extending across the ring 76 at the rear end of the cleaner, this latter ring being essentially identical to that of the front end but of somewhat greater length, positively retains the stopper in the end of the cleaner. The stopper can be secured to the rear end of the cleaner by adhesive or other suitable means, if desired.

Thus, it is seen that by pulling the stopper rearwardly to loosen it somewhat with respect to the receiver tube, the stopper can be rotated in the rear end of the tube which will rotate the cleaner whereupon the edges 72 or 73, depending on the direction of rotation, can scrape the inner cylindrical surface of the receiver tube. Also, if the cleaner is withdrawn entirely from the receiver tube, the rear edge 68 can scrape the length of the interior surface of the receiver tube.

By having the shell portion 71 of the cleaner disposed below a horizontal plane through the receiver tube, a considerable amount of solder drawn through the passageway 18 and the tube fitting 23 and into the receiver assembly will be collected within the cleaner and will be withdrawn from the receiver when the cleaner is withdrawn.

Figure 6:
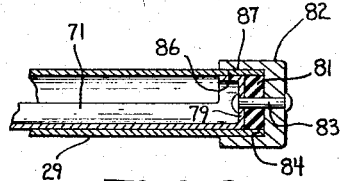
FIG. 6 is a fragmentary section through the rear end portion of the solder receiver, illustrating a closure construction alternative to that shown in FIG. 2.
Figure 7:
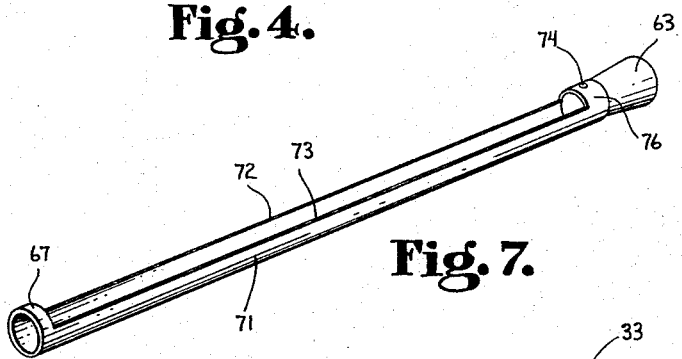
FIG. 7 is a reduced scale perspective view of the cleaner device employed in the typical embodiment.

An alternative construction for the closure is shown in FIG. 6 where the end of the cleaner 71 has an integral plate 79 thereacross to which a spacer plug 81 is mounted. A cap 82 is mounted to the spacer plug and a rivet or other suitable attachment 83 retains the cap, spacer plug, and rear end of the cleaner in proper relationship to each other. This provides an annular groove 84 which receives the end of the solder receiver 29 when the cleaner is moved forwardly in the solder receiver and the inner cylindrical surface 86 of the cap sealingly engages some portion of the outer perimetrical surface of the receiver tube which, in the illustrated example may be any portion of the outer surface 87 of the receiver tube near the rear end.

A tubular stem 88 is secured to and extends laterally from the receiver tube near its rear end. This receives the boss 89 of a rubber bulb 91. This bulb has a one-way valve 92 therein which may be of conventional construction and accommodates discharge of air from the bulb in the direction of the arrow 93 but prevents reverse flow of air into the bulb through the valve. As shown in FIG. 4, it is quite preferable to have the bulb in a position such that a force may be applied to the portion 94 of the outer surface thereof which is opposite the bulb mounting boss 89, and that a force may be applied at some point on this portion above a plane 96 through the center of the bulb and the usual rib 97 on the bulb, such that the force will pass somewhere through the handle 11 of the desoldering device and preferably through the longitudinal axis 98 thereof. This is the preferable direction of the action on the bulb in order to obtain the maximum possible use of the pumping capabilities of the bulb. It also permits support of the bulb around the portion 99 thereof below the plane 96 and does not rely on the solder receiver or receiver fastener to support the bulb while it is being pressed. By having the bulb located near the outwardly flanged frontal portion of the handle, the thumb of the hand can be rested on the portion 94 of the bulb while the remaining fingers of the hand securely encircle the rest of the handle. This makes it quite easy to operate the device.

While the use of the present invention may be already apparent, a brief description thereof may be desirable at this point. Where the device is to be used to remove solder from an electrical connection, the electrical cord is first plugged in to heat the soldering and desoldering tip. Then when the temperature of the tip is high enough to melt solder, the handle of the device may be gripped in three or four fingers of the hand with the thumb resting on top of the rubber bulb. The thumb is then depressed to force air from the bulb through the valve means whereupon the tip may be applied to the solder joint to melt the solder. As soon as the solder is melted, the thumb is released whereupon the bulb resumes its initial position drawing solder through the apertured tip and into the solder receiver. The thermally conductive tube fitting 23 will not become clogged with solder for the reason that it is in direct contact with the tip and is heated thereby, therefore, remaining at a temperature well above the melting point of the solder. The solder receiver is, however, thermally insulated from the tip by means of the thermally non-conductive air seal and so it remains relatively cool. The solder, therefore, normally solidifies after entry into the receiver where it collects in the form of small balls.

To minimize the tendency of the solder to stick to the interior of the receiver, a silicon lubricant may be used in the interior of the solder receiver and the cleaner, if desired.

It should be recognized, of course, that the tip may be applied to the soldered joint before the bulb is depressed, if desired, and the valve in the bulb will allow the air to escape through it rather than at the tip in the event the bulb is depressed after the solder is melted. In this way any tendency to blow solder off the joint is minimized. On the other hand, if desired, solder can be blown off the joint by depressing the bulb when the solder is melted by simply holding a finger over the valve outlet as the bulb is depressed.

As mentioned briefly above, any solder which may have accumulated on the interior of the solder receiver itself can be scraped free by simply loosening the solder receiver closure and rotating it and the cleaner therewith in the receiver. Or, it can be pulled out and the receiver cleaner removed from the receiver whereupon both can be shaken out.

If at any time it is desired to remove or replace the air seal at the front of the solder receiver, or the tube fitting, this can be accomplished easily by simply manually expanding the receiver fastener loop by application of thumb or finger pressure on the leg thereof. This accommodates pulling the receiver rearwardly to the extent desired and, in fact, the whole receiver, vacuum bulb, air seal, and tube fitting can be removed as a unit in this way, if desired.

Thus, it is believed apparent that the present invention is most capable of achieving the objects set out hereinabove, as well as providing advantages and benefits not specifically mentioned herein.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:
1. A desoldering tool comprising:
   a handle;
   a heating element mounted to said handle and supported thereby;
   heat transmitting means connected to said heating element and heated thereby;
   tip means connected to said heat transmitting means and having a passageway therein;
   a thermally conductive tube joining said heat transmitting means and heated thereby and communicating with said passageway;
   a solder receiver having a portion received on and supported by said tube, said tube communicating with the interior of said receiver;
   a flexible bulb supported in position adjacent said handle and coupled to said receiver for communication between the interior of said receiver and the interior of said bulb, said handle and said bulb being grippable simultaneously in an operator's hand for first collapsing said bulb and then allowing said bulb to expand to induce a flow through said passageway, said tube, and the interior of said receiver;
   and cleaner means having a portion disposed in said receiver, said portion having a closure at one end thereof sealingly engaging and closing an opening in said receiver, said cleaner means portion being rotatable in said receiver upon rotation of said closure.
2. A desoldering tool comprising:
   a handle;
   a heating element mounted to said handle and supported thereby;
   heat transmitting means connected to said heating element and heated thereby;
   tip means connected to said heat transmitting means and having a passageway therein;
   a thermally conductive tube joining said heat transmitting means and heated thereby and communicating with said passageway;
   a solder receiver having a portion received on and supported by said tube, said tube communicating with the interior of said receiver;
   a flexible bulb supported in position adjacent said handle and coupled to said receiver for communication between the interior of said receiver and the interior of said bulb, said handle and said bulb being grippable simultaneously in an operator's hand for first collapsing said bulb and then allowing said bulb to expand to induce a flow through said passageway, said tube, and the interior of said receiver;
   and cleaner means having a portion disposed in said receiver, said portion having a closure secured thereto at one end thereof, said closure sealingly engaging and closing an opening in said receiver, said cleaner means portion being movable in said receiver by effecting movement of said closure relative to said receiver to clean the interior of said receiver.
3. The desoldering tool of claim 2 wherein said closure is a stopper sealingly engaging an inner curved perimetrical surface of said receiver.
4. The desoldering tool of claim 2 wherein said closure is a cap sealingly engaging an outer curved perimetrical surface of said receiver.
5. A desoldering tool comprising:
   heating means;

apertured tip means associated with said heating means and heated thereby;

an elongated solder receiver coupled to said apertured tip means to accommodate movement of solder through said tip means and into said receiver;

a flexible chamber member coupled to the side of said receiver;

and stand means mounted on said receiver and insulated from said heating means, said stand means comprising a wire loop surrounding an outer surface of said receiver, said loop having a free form internal diameter which is less than the greatest dimension across said receiver outer surface measured transverse to the length of said receiver whereby it is necessary to elastically enlarge said loop to mount it on said receiver, said wire loop thereupon having sufficient energy stored therein to contract onto and grip said receiver, thereby resiliently embracing said receiver and thereby secured to said receiver, and a pair of support legs divergingly extending from said loop, one of said legs being resiliently movable toward the other of said legs to enlarge said loop to accommodate movement of said loop on said receiver.

6. The desoldering tool of claim 5 wherein said loop and legs are a continuous piece of wire with the legs being provided adjacent opposite ends of the piece of wire.

7. A desoldering tool comprising:
handle means;
heating means mounted to said handle means;
apertured tip means associated with said heating means and heated thereby;
a solder receiver coupled to said apertured tip means to accommodate movement of solder through said tip means and into said receiver;
receiver fastening means mounted on said handle, said fastening means including a first portion received on said handle means, and said fastening means further including a second portion extending from said first portion;
and said fastening means further including a third portion resiliently embracing said receiver and extending from said second portion, and said fastening means further including a fourth portion extending from said third portion and manually operable to release the embrace of said third portion on said receiver whereupon said receiver is movable with respect to said third portion of said fastening means;
and means coupled to said receiver to induce a flow through said tip means and said receiver.

8. The tool of claim 7 wherein:
at least one of said portions is formed of a single piece of resilient wire.

9. The tool of claim 7 wherein:
said third portion includes wire looped around said receiver, with said second portion joining one end of a loop and said fourth portion joining another end of a loop.

10. The tool of claim 7 wherein:
said fourth portion is formed to provide a digit accommodating surface facilitating manual operation thereof.

11. The tool of claim 7 and further comprising:
support means mounted adjacent said tip means;
said support means, said handle means, and said fastener means each having a marginal point thereon co-operating with marginal points of the other two of said means to define the apices of a triangle lying in an imaginary plane touching said tool at said marginal points only, said tool being thereby supportable by said support means, said handle means, and said fastener means at three points on a planar supporting surface, with said tip means being in spaced relation to the plane of said points and thereby in spaced relation to the supporting surface.

12. A desoldering tool comprising:
handle means;
heating means mounted to said handle means;
apertured tip means associated with said heating means and heated thereby;
an elongate solder receiver tube of circular cross section coupled to said tip means to accommodate movement of solder through said tip means and into said receiver;
a flexible chamber member mounted adjacent said handle means and communicating with the interior of said tube through the side of said tube;
cleaner means movably disposed in said receiver tube;
said cleaner means including a circular ring portion whose outer circumferential surface is adjacent the interior surface of said receiver tube;
said cleaner means further including an elongate semi-cylindrical shell adjoining said ring portion and having marginal edges adjacent said interior surface for scraping residue from a portion of the interior surface of said receiver tube upon rotational motion of said cleaner means in said receiver tube;
closure means mounted to the end of said receiver tube and connected to said cleaner means, said closure means being removable from the end of said receiver tube for removing said cleaner means from said tube, facilitating cleaning and removal of residue from said receiver tube and cleaning means without disturbing said flexible chamber member.

13. In a desoldering tool, the combination comprising:
handle means;
heating means mounted to said handle means;
a solder receiver;
and receiver fastening means, said fastening means including a first portion received on said handle means;
said fastening means including a second portion extending from said first portion;
said fastening means further including a third portion resiliently embracing said receiver and extending from said second portion;
and said fastening means further including a fourth portion extending from said third portion and manually operable to release the embrace of said third portion on said receiver.

14. The combination of claim 13 wherein:
at least one of said portions is formed of a single piece of resilient wire.

15. The combination of claim 13 wherein:
said third portion includes wire looped around said receiver, with said second portion joining one end of a loop of said wire and said fourth portion joining another end of a loop of said wire.

16. The combination of claim 13 wherein:
said fourth portion has a digit accommodating surface facilitating manual operation thereof.

References Cited by the Examiner

UNITED STATES PATENTS

| | | | |
|---|---|---|---|
| 882,636 | 3/1908 | Hopkins | 24—261.1 |
| 1,097,746 | 5/1914 | Benton | 248—175 |
| 2,491,891 | 11/1949 | Caldwell | 248—175 |
| 2,817,129 | 12/1957 | Roberts et al. | 24—27 |
| 2,957,217 | 10/1960 | Mortorelli | 24—27 |
| 3,131,444 | 5/1964 | Manning | 24—27 |
| 3,163,145 | 11/1964 | Duhaime et al. | 228—20 |
| 3,172,382 | 3/1965 | Weglen. | |

FOREIGN PATENTS 10,500  4/1914  Great Britain.

JOHN F. CAMPBELL, *Primary Examiner.*

WHITMORE A. WILTZ, *Examiner.*

M. L. FAIGUS, *Assistant Examiner.*